United States Patent [19]

Hearne, Jr. et al.

[11] Patent Number: 5,564,287

[45] Date of Patent: Oct. 15, 1996

[54] MULTIPLE PRODUCE TRANSPORT VEHICLE COOLING APPARATUS

[75] Inventors: William P. Hearne, Jr., 17946 Hampshire La., Boca Raton, Fla. 33498; Stan Badenhop, Jacksonville, Fla.

[73] Assignees: William P. Hearne, Jr., Boca Raton; Packaged Refrigeration Systems, Inc., Jacksonville, both of Fla.

[21] Appl. No.: 306,661

[22] Filed: Sep. 15, 1994

[51] Int. Cl.⁶ .................................................. F25D 15/00
[52] U.S. Cl. ........................ 62/237; 62/309; 62/310; 62/441; 62/448
[58] Field of Search .................... 62/237, 299, 265, 62/441, 304, 309, 310, 314, 448

[56] References Cited

U.S. PATENT DOCUMENTS

| | | | |
|---|---|---|---|
| 2,303,867 | 12/1942 | Stebbins | 62/237 |
| 4,884,411 | 12/1989 | Wallace et al. | 62/418 |
| 4,934,255 | 6/1990 | McDonnell et al. | 62/237 |

*Primary Examiner*—John M. Sollecito
*Attorney, Agent, or Firm*—Thomas C. Saitta

[57] ABSTRACT

A portable produce cooling apparatus capable of cooling produce loaded into a number of transport vehicles simultaneously is disclosed, the apparatus having a number of ports with air egress means, forced air means and air ingress means, the apparatus having a lower common warm air chamber and an upper common cold air chamber separated by a horizontally mounted air-to-water heat exchanger means, such that warm air from each of the transport vehicles enters the lower common warm air chamber, passes upward through the heat exchanger means, into the upper common cold air means, and out the individual air egress means into the transport vehicles.

8 Claims, 2 Drawing Sheets

FIG. 2
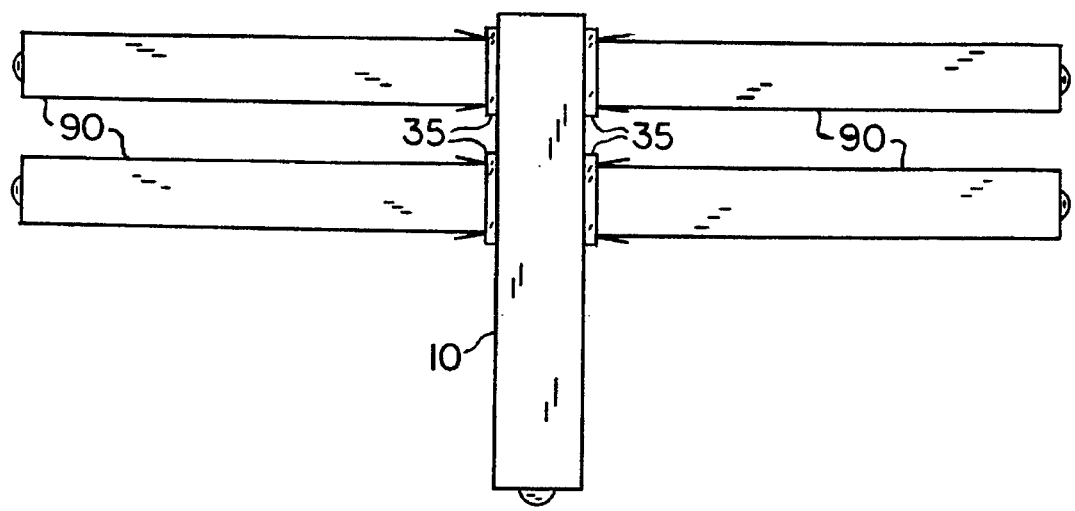
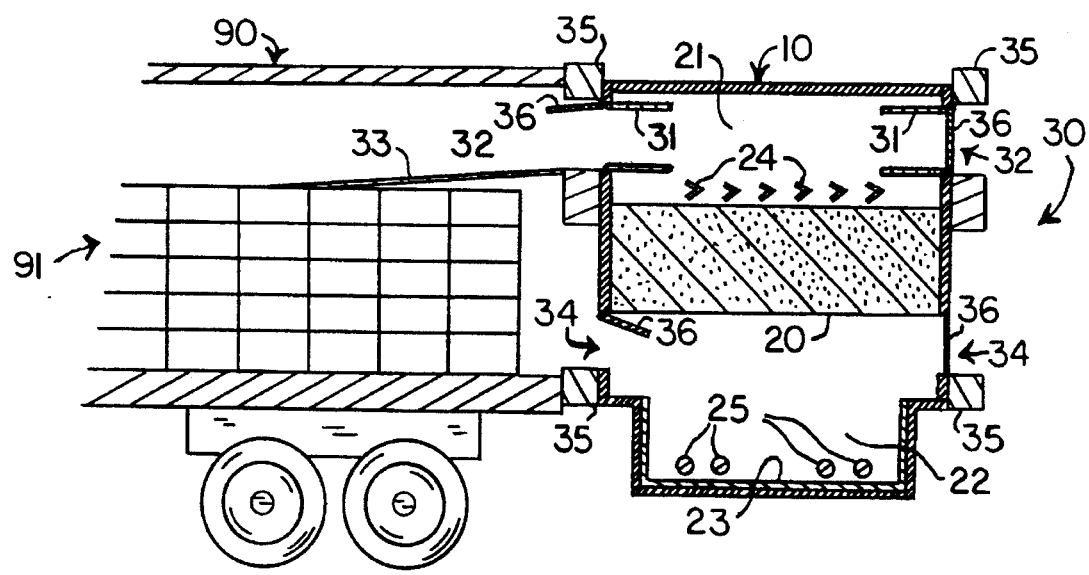
FIG. 4

MULTIPLE PRODUCE TRANSPORT VEHICLE COOLING APPARATUS

BACKGROUND OF THE INVENTION

This invention relates in general to an apparatus for cooling harvested fruits and vegetables prior to transportation from the harvesting site. More particularly, the invention relates to such an apparatus which cools the harvested produce inside the transport means. Even more particularly, the invention relates to an apparatus which is self-contained, portable, and utilizes forced air circulation and water-to-air heat exchange to cool the produce.

Once fruits and vegetables are harvested, the ripening or spoilage process begins immediately. It is well known that cooling or refrigeration of the produce slows ripening and reduces this deterioration, thus increasing shelf life and freshness. The more rapidly the produce is cooled following harvest, the better the results. Since harvesting usually occurs during warm weather months, the produce contains a large amount of field heat. Additionally, the transport trailers into which the produce is loaded will have a high residual heat. Finally, the produce itself creates heat through respiration. The deterioration due to heat is directly related to loss of moisture from the produce, which shortens shelf life and reduces the quality of the produce. The differential in vapor pressure between the produce cells and the surrounding air determines the rate of moisture loss. Low air temperature and high moisture content lowers moisture loss from the produce. It is important to lower the surface temperature of the produce, remove the heat from the air in the transport trailer and maximize the moisture content of the air in the trailer as quickly as possible.

Devices to perform cooling of this general nature have long been known. In U.S. Pat. No. 2,293,316, Stebbins shows an air circulating device for cooling produce in trailers, trucks or train cars using a large fan and cooling coils, as does Wilson et al. in U.S. Pat. No. 2,778,206. More recently, devices have been developed which perform the task in an improved manner, such as shown by Windecker in U.S. Pat. No. 4,598,555, McDonald et al. in U.S. Pat. No. 4,934,255 and Davis et al. in U.S. Pat. No. 5,054,291.

It is an object of the invention to improve upon the known prior art by providing an apparatus which maximizes the cooling efficiency of the process by decreasing cooling time and maintaining high moisture content, allows multiple transport trailers to be cooled at the same time, and maximizes the energy efficiency of the cooling means itself. In furtherance of this object, an apparatus is provided which comprises multiple ports for connection with individual transport trailers, the ports having individual forced air means, air ingress means and air egress means, the air egress means for all ports connecting to a common cool air chamber and the air ingress means for all ports connecting to a common warm air chamber, the two chambers separated by a single air to water heat exchanger.

SUMMARY OF THE INVENTION

The apparatus of the invention comprises a self-contained, preferably transportable, housing having a number of ports adapted to receive and sealingly mate with the rear openings of standard tractor-trailer transport vehicle units containing stacked, air permeable containers of harvested produce. Each port comprises forced air means to direct a stream of cooled air into the upper interior of the trailer over an air impervious sheet which rests on the top of the stacked produce to form a plenum at least one quarter of the distance into the trailer. Each port further comprises an upper air egress to allow forced passage of the cool air from the housing into the trailer and a lower air ingress to allow passage of the air containing heat removed from the produce back into the housing. Surrounding each port are sealing means adapted to match the rear structure of the trailer to prevent ambient air from entering the trailer and to prevent internal air from escaping to the ambient. Within the housing is a lower common warm air chamber which receives air from each of the air ingresses and an upper common cold air chamber which is accessed by each of the air egresses. The lower common warm air chamber is separated from the upper common cold air chamber by an air-to-water heat exchanger, such that air must pass through the heat exchanger in moving from the lower common warm air chamber to the upper common cold air chamber. The heat exchanger is mounted horizontally and preferably comprises a water cascade over a high surface area material, such that direct air-to-water contact is achieved with the refrigerated water flowing downward and the warm air rising upward. Refrigeration of the water is accomplished in a collector tank or sump using standard type refrigeration coils, and the water is recycled through the system. A mist eliminator mounted above the heat exchanger removes any excess free moisture from the cooled air.

BRIEF DESCRIPTION OF THE DRAWINGS

FIG. 2 is a top view of the invention as seen in operation with a number of tractor-trailers.

FIG. 4 is a cross-sectional view taken through one of the multiple ports of the invention.

DETAILED DESCRIPTION OF THE INVENTION

Figure 1:
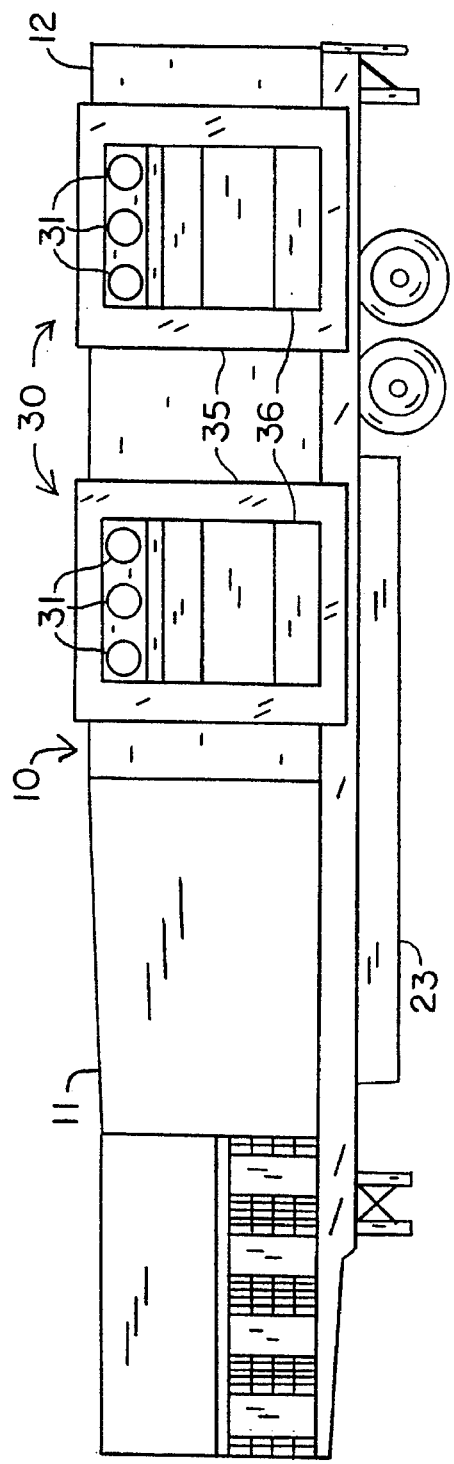
FIG. 1 is a side view of the invention showing a preferred embodiment of the housing.
Figure 3:
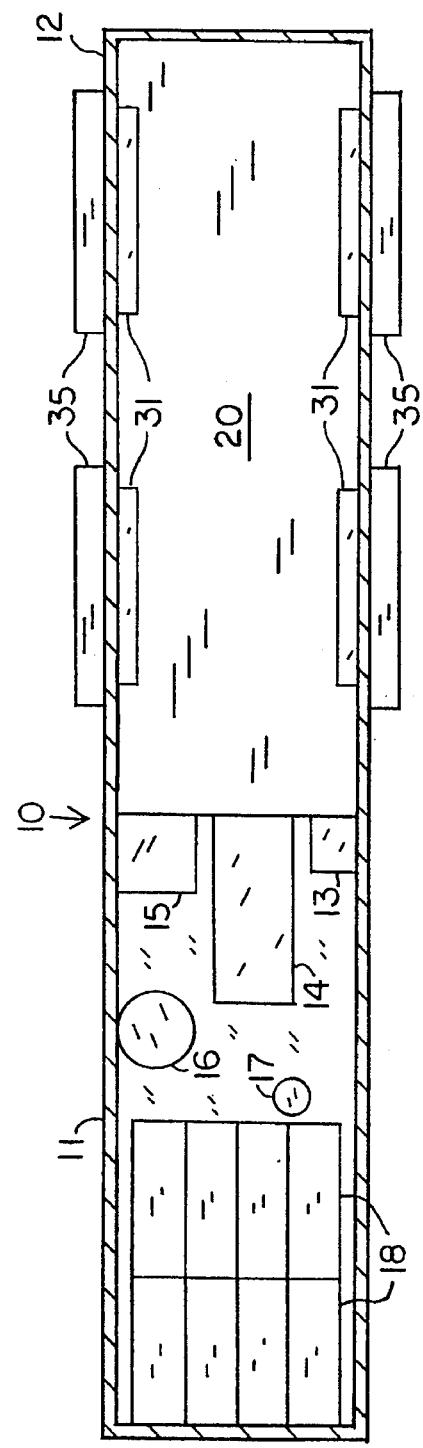
FIG. 3 is an exposed top view showing some of the major components of the invention.

With reference to the drawings, the invention is now described in detail, with explanation of the best mode and preferred embodiments. As shown in FIGS. 1 and 2, the invention comprises a main housing unit 10 which in the preferred embodiment is a transportable trailer unit having wheels and means to connect the unit to a truck. The housing 10 comprises a generally rectangular, self-contained unit with two main sections—an operations section 11 to house the operational elements for power generation and refrigeration, and a treatment section 12 to house the air treatment components. While it is not essential for the housing 10 to be transportable, it is preferred so that the invention can be positioned as near to the point of harvest as is practical, as well as providing a way to relocate the invention at different harvest sites. This enables the cooling process to be initiated as rapidly as possible after the produce is harvested and loaded into the transport tractor-trailers 90. In the preferred embodiment, as shown also in FIG. 3, the operations section 11 occupies the forward portion of the housing 10 and contains a power generator 13, a diesel engine 14, a compressor 15, an accumulator 16, a condenser pump 17 and evaporative condensers 18. The rearward treatment section 12 contains the heat exchanger means 20 and a number of ports 30 adapted to mate with the rear openings of individual tractor-trailers 90.

Each port 30 comprises means 31 to force air from the interior of the treatment section 12 into the upper portion of a typical transport vehicle, such as tractor-trailer 90, loaded with a number of stacked, air-permeable produce containers 91, air egress means 32 to allow passage of the cooled air from the treatment section 12 into the tractor-trailer 90, an air impermeable sheet means 33 to form a plenum, in conjunction with the ceiling and side walls of the tractor-trailer 90, to direct the cooled air to the front of the tractor-trailer 90 along the top of the produce containers 91, air ingress means 34 to allow passage of the warmed air from the interior of the tractor-trailer back into the interior of the treatment section 12, and sealing means 35 to seal the junction between the open rear of the tractor-trailer 90 and the housing 10. These components can be seen with reference to FIG. 4. Forced air means 31 can comprise a single or multiple fans oriented to pull air from the interior of the upper common cold air chamber 21 and force it into the interior of tractor-trailer 90 through air egress means 32. Preferably the fan or fans comprising forced air means 31 are variable speed fans, such that the velocity and amount of the cold air directed into the tractor-trailer 90 and through the stacked produce containers 91 can be varied depending on the particular produce being cooled. It is preferred that forced air means 31 be mounted adjacent air egress 32 so as to force air into the tractor-trailer 90, although the forced air means 31 could be adapted to pull warm air from the tractor-trailer 90 through air ingress means 34 and into the lower common warm air chamber 22. Having the forced air means 31 mounted in conjunction with the upper air egress means 32 is the best way to insure that cool air reaches the front interior portion of the tractor-trailer 90 so that all the stacked produce containers 91 are cooled. Air egress means 32 comprises an opening in the wall of housing 10 which can be closed, preferably with an automatic, powered door or flap 36, when a particular port 30 is not in use. In the preferred embodiment, door 36 can be opened or closed with the tractor-trailer 90 in mated position with port 30. In this way no cold air will be lost from the treatment section 12 during the mating process.

An air impermeable sheet member 33 extends into the upper portion of the tractor-trailer 90 from beneath air egress means 32. Sheet member 33 rests on the top of the stacked produce containers 91 in the rear of the tractor-trailer 90 and creates a plenum in conjunction with the roof and side walls of the tractor-trailer 90. Preferably sheet member 33 extends at least about ten feet into the rear of the tractor-trailer 90, or approximately one quarter of the length of a typical 40 foot tractor-trailer 90. The plenum formed by sheet member 33 directs the air to the front of the tractor-trailer 90 and prevents the incoming cold air from flowing immediately downward into the produce containers 91 at the rear. Sheet member 33 can be made of any flexible, semi-rigid or rigid sheet or fabric material, and could also be configured in a tube shape to completely surround air egress means 32.

As the cold air is directed by forced air means 31 into the upper portion of tractor-trailer 90, it flows downward into and through the produce containers 91, cooling the air and the produce itself. Sealing means 35 insure that the only available exit for the warmed air is back into the lower common warm air chamber 22 of treatment section 12 through air ingress means 34. Sealing means 35 comprises means such as a compressible gasket or pad extending around the perimeter of port 30 in a configuration adapted to match the rear configuration of the opening of a tractor-trailer 90. For example, a rectangular foam rubber pad approximately 10 inches thick, 12 inches wide on the top and bottom and 18 inches wide on the sides is affixed around the port 30 such that air egress means 32 and air ingress means 34 are confined within the interior of the sealing means 35. As the tractor-trailer 90 is backed into position to connect with port 30, the ends of the top, bottom and side walls press against the sealing means 35, creating a seal which prevents air movement between the ambient environment and the interior of the tractor-trailer 90 or treatment section 12. As with air egress means 32, air ingress means 34 is closeable by a door 36 when not in use, preferably by automatic, powered means to prevent cold air loss.

The treatment section 12 of housing 10 mainly comprises heat exchanger means 20, upper common cold air chamber 21 and lower common warm air chamber 22. All ports 30 are conduits between the tractor-trailers 90 and the treatment section 12. Each of the air egress means 32 connect to the upper common cold air chamber 21 and each of the air ingress means 34 connect to the lower common warm air chamber 22. The upper common cold air chamber 21 is separated from the lower common warm air chamber 22 by heat exchanger means 20, such that all air entering the upper common cold air chamber 21 must pass through heat exchanger means 20 to be cooled. Heat exchanger means 20 is a horizontally mounted air-to-water heat exchanger utilizing direct air to water contact to remove heat from the air. The heat exchanger 20 extends the length and width of the treatment section 12 of housing 10, and preferably comprises a chilled water cascade through a high surface area to volume media. For example, special PVC material is obtainable having 80 square feet of surface for each cubic foot of volume. Low pressure, high volume, non-misting spray nozzles evenly distribute chilled water over the entire upper surface of the heat exchanger 20, the water flowing through the heat exchanger 20 and dripping out from the bottom into a water collection tank or sump 23 in the floor of the treatment section 12. The water is chilled in the water collection tank 23 by the refrigeration system of the operations section 11, preferably using refrigeration coils 25 submerged in the water. The chilled water is then pumped up to the spray nozzles and continuously cycled through the heat exchanger 20. It is possible to lower the temperature of the chilled water below 32 degrees F. by using additives such as salt or propylene glycol to lower the freezing point.

The warm air inside the lower common warm air chamber 22 is drawn upward by the forced air means 31 through the chilled water cascade in the heat exchanger 20 and into the upper common cold air chamber 21. The heat absorbed by the air inside the tractor-trailer 90 is removed by contact with the chilled water, such that the temperature of the air entering the upper common cold air chamber 21 is much lower than its original temperature in the lower common warm air chamber 22. A horizontally mounted heat exchanger 20 with a downward cascade of water and an upward flow of air is preferred for efficiency. With this technique, the temperature of the air can be lowered to the temperature of the chilled water. The advantage for having an upper common cold air chamber 21 and a lower common warm air chamber 22 resides in the ability to perform the cooling operation as a batch operation rather than a continuous one. As individual ports 30 are opened as individual tractor-trailers 90 are connected to the housing 10, the overall effect on the system is minimized since the new warm air enters the lower common warm air chamber 22. This new warm air represents a relatively small amount of the total volume of air in the lower common warm air chamber 21, so the overall temperature of the lower common warm air chamber 22 is elevated only slightly. Likewise, the amount of cold air removed from the upper common cold air chamber 21 into any one tractor-trailer 90 also represents only a small amount of the total volume of cold air in the upper common cold air chamber 21. Thus the overall temperature change effect on the treatment section 12 is not dramatic and the system can operate in a steady manner rather than with a series of peaks and valleys for refrigeration energy requirements, as opposed to those systems which have individual units for each port.

Preferably, the treatment section 12 also comprises mist eliminator means 24. While extremely high humidity (above 95 percent) is desirable for the cold air directed into the tractor-trailers 90, there should not be any free moisture in the air, as this will degrade any cardboard produce containers 91 and can cause mold or mildew growth on the produce. Mist eliminator means 24 can be a series of baffles positioned above the heat exchanger means 20 such that the chilled air must flow through the baffles to reach the upper common cold air chamber 21. Any free moisture will impinge and adhere to the baffle surfaces, eventually dripping back into the heat exchanger 20.

For most produce, transport temperatures somewhere in the range of 32 to 55 degrees provide the best conditions for minimizing spoilage. Calculation of the required refrigeration capacity for the invention is dependent on such factors as ambient temperature, the specific heat of the produce, the number of loads per day and pounds per day of produce to be cooled, etc. these calculations are well within the skill of those knowledgeable in the art. For example, a sample refrigeration calculation to determine the necessary components required to achieve operational efficiency in a 3 port model of the invention for 12 loads per day of 40,000 pounds of produce having a specific heat of 0.93, with ambient temperature of 85 degrees and desired transport temperature of 45 degrees results in a required refrigeration capacity of 124 tons (allowing for 10 tons of thermal losses and air infiltration and 21 tons of fan and pump load). For air flow of 12,000 CFM from 4 fans at each port the total air flow is 144,000 CFM and water flow is 1800 GPM. This will produce cooling times of between 3 to 5 hours per load.

It is contemplated that substitutions and equivalents may be obvious to those skilled in the art, and the above illustrations are by way of example only. The true scope and definition of the invention therefore is to be as set forth in the following claims.

We claim:

1. An apparatus for cooling produce loaded in transport vehicles, the apparatus being adapted to cool a plural number of transport vehicles independently and concurrently, the apparatus comprising:

(A) a housing containing an operations section and an air treatment section, said operations section containing refrigeration means to provide chilled water and said air treatment section containing air-to-water heat exchanger means to cool air removed from said transport vehicles;

(B) a plural number of ports adapted to sealingly mate with said transport vehicles, each said port having air egress means for conducting air from said air treatment section into said transport vehicle, forced air means to deliver said cool air into said transport vehicle, air ingress means for conducting warm air from said transport vehicle into said air treatment section, and door means to close each said port individually;

(C) said air treatment section comprising a lower common warm air chamber connected to all said air ingress means, an upper common cold air chamber connected to all said air egress means, and said air-to-water heat exchanger means, where said heat exchanger means is positioned between said lower common warm air chamber and said upper common cold air chamber and comprises a horizontally mounted high surface area material having said chilled water flowing downward, where said warm air travels from said transport vehicles through said air ingress means, into said lower common warm air chamber, upward through said heat exchanger means, into said upper common cold air chamber and out said air egress means into said transport vehicles.

2. The apparatus of claim 1, where said housing is transportable.

3. The apparatus of claim 1, further comprising an air impervious sheet member extending from said air egress means into said transport vehicles.

4. The apparatus of claim 1, further comprising sealing means positioned around each said port.

5. The apparatus of claim 1, where said door means automatically open and close.

6. The apparatus of claim 5, where each said door means open and close while each said transport vehicle is mated with each said port.

7. The apparatus of claim 1, further comprising mist eliminator means positioned above said heat exchanger means.

8. The apparatus of claim 1, where said forced air means comprises a plural number of fans.

\* \* \* \* \*